United States Patent
Frelich et al.

(10) Patent No.: US 9,206,562 B2
(45) Date of Patent: Dec. 8, 2015

(54) GRADE PROPULSION SYSTEM AND METHOD

(71) Applicant: Caterpillar Paving Products Inc., Brooklyn Park, MN (US)

(72) Inventors: Toby A. Frelich, St. Michael, MN (US); Kea V. Chin, Washington, IL (US); Steven R. Queen, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 4 days.

(21) Appl. No.: 13/783,482

(22) Filed: Mar. 4, 2013

(65) Prior Publication Data

US 2013/0238210 A1 Sep. 12, 2013

Related U.S. Application Data

(60) Provisional application No. 61/608,448, filed on Mar. 8, 2012.

(51) Int. Cl.
*E01C 19/00* (2006.01)
*B60W 30/18* (2012.01)
*E01C 19/48* (2006.01)
*B60W 10/103* (2012.01)
*B60W 10/184* (2012.01)

(52) U.S. Cl.
CPC ............ *E01C 19/004* (2013.01); *B60W 10/103* (2013.01); *B60W 10/184* (2013.01); *B60W 30/18118* (2013.01); *E01C 19/48* (2013.01); *B60W 2550/142* (2013.01)

(58) Field of Classification Search
CPC ............... B60T 7/122; B60T 2201/06; B60W 2550/142; B60W 10/06; B60W 30/143; B60W 30/18118
See application file for complete search history.

(56) References Cited

U.S. PATENT DOCUMENTS

| 5,726,551 | A | * | 3/1998 | Miyazaki et al. | 320/124 |
| 6,027,177 | A | * | 2/2000 | Ferguson et al. | 303/3 |
| 7,206,682 | B2 | * | 4/2007 | Bodin et al. | 701/67 |
| 7,226,389 | B2 | | 6/2007 | Steen et al. | |
| 2004/0239288 | A1 | * | 12/2004 | Harrison et al. | 320/104 |
| 2005/0171679 | A1 | * | 8/2005 | Markyvech | 701/110 |
| 2005/0246081 | A1 | * | 11/2005 | Bonnet et al. | 701/38 |
| 2006/0170284 | A1 | * | 8/2006 | Alvarez et al. | 303/191 |
| 2007/0029876 | A1 | * | 2/2007 | Makishima et al. | 303/191 |
| 2009/0054200 | A1 | * | 2/2009 | Soliman et al. | 477/5 |
| 2009/0107740 | A1 | * | 4/2009 | Bell et al. | 180/65.1 |
| 2009/0212626 | A1 | * | 8/2009 | Snyder et al. | 307/10.1 |
| 2011/0065548 | A1 | * | 3/2011 | Yu et al. | 477/203 |
| 2011/0169323 | A1 | | 7/2011 | Tseng et al. | |
| 2011/0202245 | A1 | | 8/2011 | Cayol et al. | |
| 2012/0072097 | A1 | * | 3/2012 | Ohta et al. | 701/118 |

FOREIGN PATENT DOCUMENTS

EP 2113433 11/2009

* cited by examiner

*Primary Examiner* — John R Olszewski
*Assistant Examiner* — Nicholas K Wiltey
(74) *Attorney, Agent, or Firm* — Joseph E. Reed

(57) ABSTRACT

A grade propulsion system provided herein includes: a propel pump; a brake system; an operator control configured to receive and transmit a propel command and a Hill Mode activation; and a controller electronically coupled to the propel pump, the brake system, and the operator control, the controller configured, after activation of the Hill Mode and the propel command, to transmit a propel current to the propel pump and disengage the brake system when the propel current is equal to or greater than a cracking current plus an offset current.

11 Claims, 2 Drawing Sheets

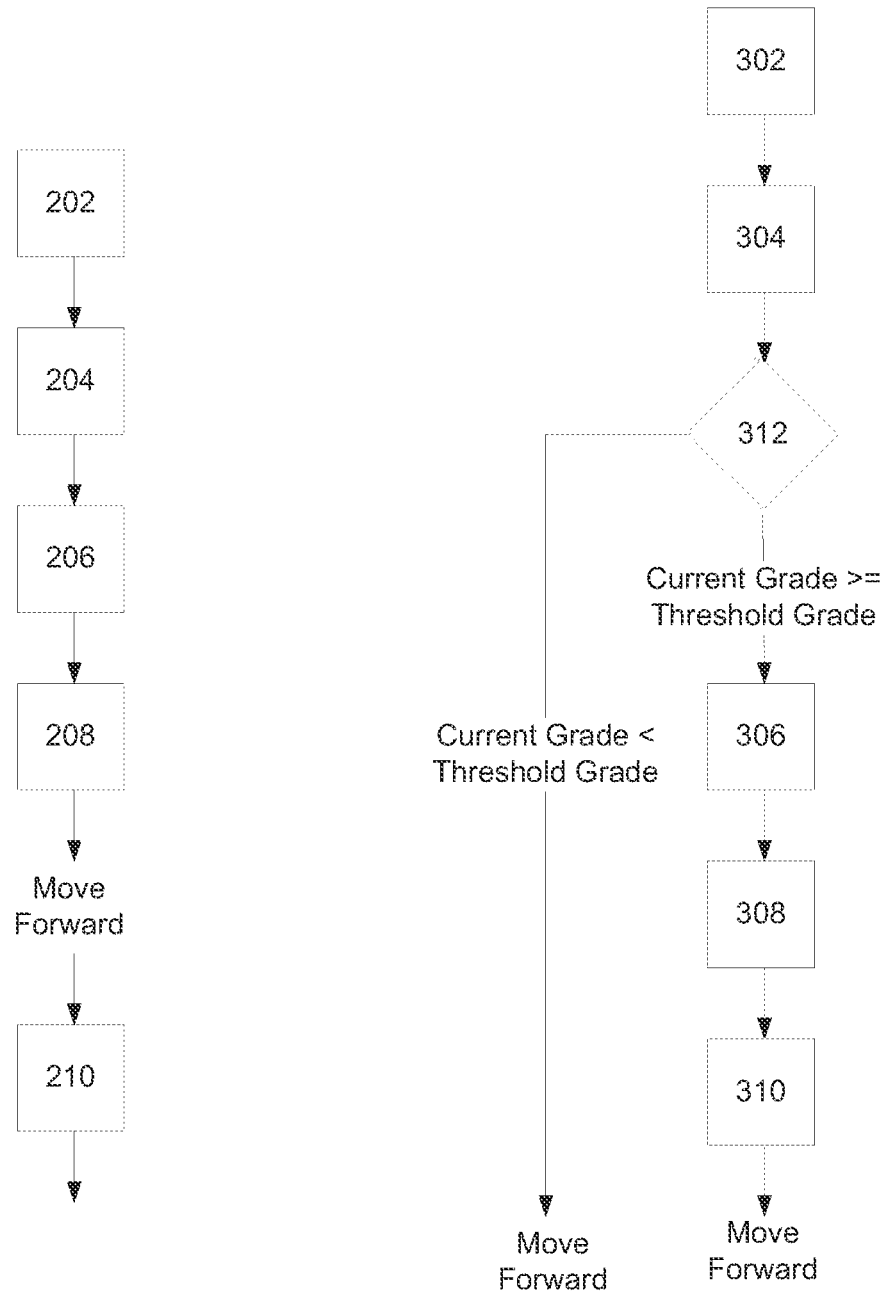

GRADE PROPULSION SYSTEM AND METHOD

CLAIM FOR PRIORITY

The present application claims priority from U.S. Provisional Application Ser. No. 61/608,448, filed Mar. 8, 2012, which is fully incorporated herein.

TECHNICAL FIELD

Embodiments of the present disclosure pertain to a grade propulsion system and method, and more particularly to a grade propulsion system and method for a paving machine.

BACKGROUND

A paving machine (e.g., a paver) is used in combination with a screed to lay a paved surface, also referred to as a mat or paving mat, such as asphalt. A paving machine may periodically stop movement during a paving operation, for example while additional paving material is added into the machine's hopper.

When the paving machine stops on an inclined surface (e.g., a steep grade), a braking mechanism is engaged to prevent the machine from moving, e.g., rolling backwards. However, when the braking mechanism is disengaged, conventional paving machines may experience rollback which can introduce defects into the paving mat.

U.S. Pat. No. 7,206,682 issued to Bodin, et. al. on Apr. 17, 2007, discloses a method and arrangement for facilitating hill-starting of a stationary motor vehicle.

SUMMARY

According to aspects disclosed herein, systems and methods are provided to control a propulsion system to prevent rollback on a grade.

According to an embodiment herein, a paver includes: a propel pump; a brake system; an operator control configured to receive and transmit a propel command and a Hill Mode activation; and a controller electronically coupled to the propel pump, the brake system, and the operator control, the controller configured, after activation of the Hill Mode and the propel command, to transmit a propel current to the propel pump and disengage the brake system when the propel current is equal to or greater than a cracking current plus an offset current.

According to another embodiment herein, a paver includes: a propel pump; a brake system; an inclination sensor for detecting a current paving grade, a memory unit configured to store a cracking current and an offset current-inclination map; a controller electronically coupled to the propel pump, the brake system, the inclination sensor, and the memory unit, the controller configured to receive the current paving grade from the inclination sensor, and after receiving a forward propel signal, to determine an offset current according to the current paving grade, to transmit a propel current to the propel pump, and to disengage the brake system when the propel current is equal to or greater than a cracking current plus the offset current.

According to another embodiment herein, a method of propulsion includes: receiving a Hill Mode activation signal; receiving a propulsion command; transmitting a propel current; and disengaging a brake system when the propel current is greater than or equal to a cracking current plus an offset current.

According to another embodiment herein, a method of propulsion comprising: determining an inclination; receiving a propulsion command; determining an offset current; transmitting a propel current; and disengaging a brake system when the propel current is greater than or equal to a cracking current plus the offset current.

BRIEF DESCRIPTION OF THE DRAWINGS

FIGS. 2 and 3 are block diagrams of control methods for propulsion;

DETAILED DESCRIPTION

Figure 1:
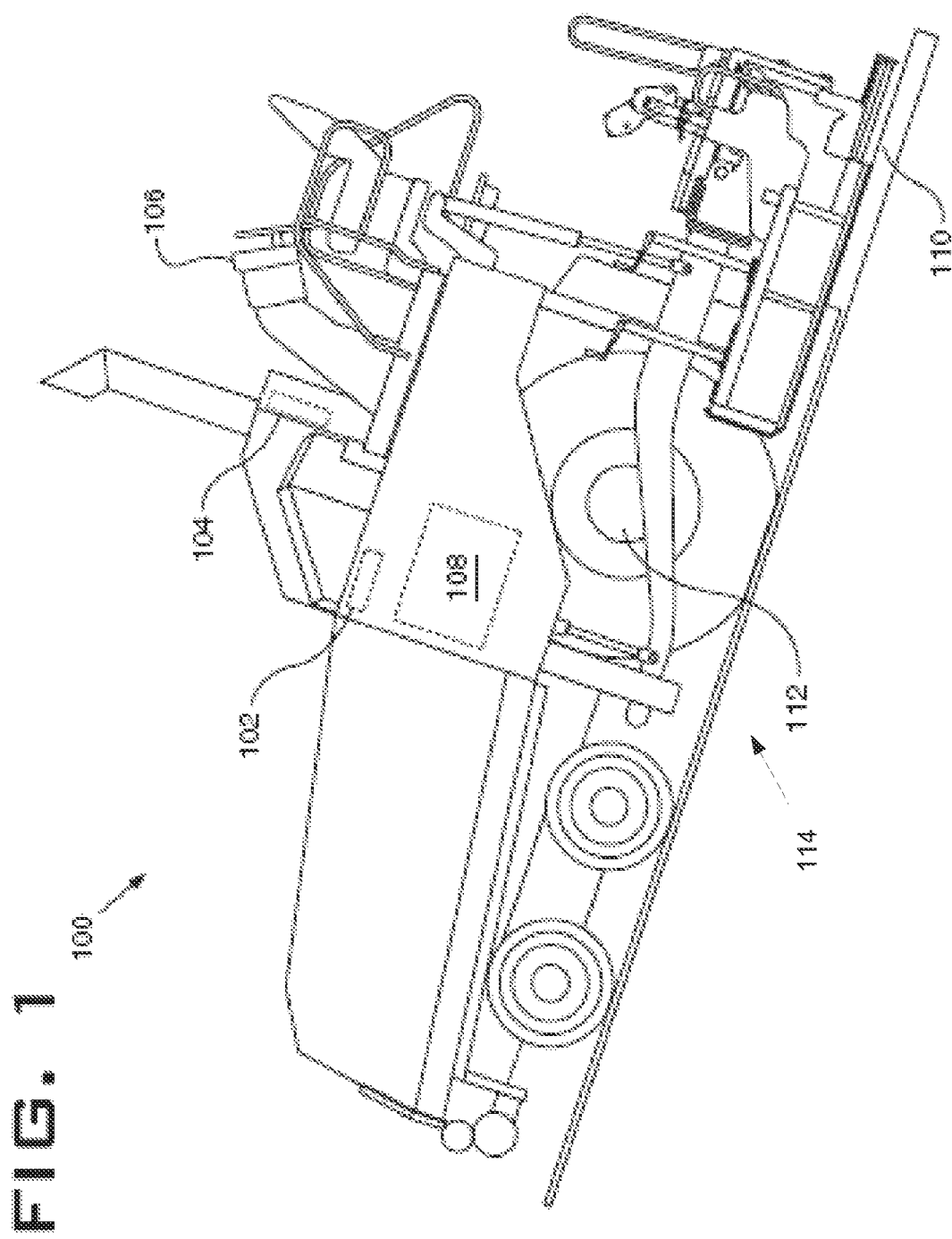
FIG. 1 illustrates an exemplary machine according to an embodiment described herein.

Exemplary embodiments of the present invention are presented herein with reference to the accompanying drawings. Herein, like numerals designate like parts throughout.

FIG. 1 illustrates an exemplary machine according to an embodiment described herein;

When a conventional paver stops on a grade, the propulsion system is stopped and a braking mechanism is engaged to prevent the machine from moving or rolling downhill. However, when the propulsion system of a paver is reengaged, the braking system of the paver is disengaged and the paving machine may experience rollback. The amount of rollback can vary based according to various machine characteristics (e.g., track type, weight, etc.) and according to the slope of the grade. This rollback may occur until the paver's propulsion system provides sufficient propulsion to offset the rollback.

According to FIG. 1, a machine 100 (e.g., a paving machine 100 or paver 100) may travel along an unpaved surface 114. As shown in FIG. 1, the unpaved surface 114 may have a grade that is not flat (e.g., an inclined grade). As the paver traverses along the unpaved surface 114, the paver 100 may lay a paved surface 110, also referred to as a paving mat 110 or a mat 110 (e.g., asphalt).

The paver 100 includes: a controller 104 (e.g., an electronic control module "ECM" 104), an operator control 106, a propel pump 108 (or propel pumps 108), and a brake system 112. The paver 100 may also include an inclination sensor 102 for detecting the current grade of the surface (paved or unpaved).

The operator control 106 may be configured to receive a command from the operator. For instance, the operator control 106 may receive propulsion commands such as stop or go forward, and may also receive commands to activate or deactivate a steep grade propulsion mode, (referred to herein as a "Hill Mode").

According to another embodiment herein, the machine 100 may also include an inclination sensor 102 configured to determine the grade of the surface (e.g., the unpaved surface 114). The inclination sensor may electronically communicate with the ECM 104 and transmit the grade of the unpaved surface 114 to the ECM 104. The inclination sensor 102 may be configured to generate periodic, continuous, or on-demand inclination values and electronically transmit the inclination values to the ECM 104. When an inclination sensor 102 is provided, the ECM 104 may automatically engage or disengage "Hill Mode" according to the grade detected by the inclination sensor 102.

For example, the amount of current required by the propel pump 108 for forward propulsion on a level surface is referred to herein as the cracking current. The cracking current depends on the machine characteristics, but may be determined or calibrated for an individual machine 100 or for a machine type.

Additionally, the amount of additional current required by the propel pump 108 to generate forward motion on a grade is referred to herein as the offset current. The offset current is determined by various machine characteristics (e.g., wheel or track-type machine, machine weight, etc.) and by the grade of the incline the machine is on. Because, the machine characteristics are relatively constant they may be predetermined (e.g., calibrated), and accordingly used to help determine the offset current. Additionally, the offset current is more heavily affected by the machine characteristics which can be measured and calibrated for the paver 100 in advance. The affect of the grade on the offset current can be approximated for a range of grades (e.g., from about 5 to 20 percent) and used with the known characteristics to generate the offset current (e.g., a predetermined approximate offset current). Therefore, the offset current may be approximated to accommodate a specific machine type for incline grades between approximately 5 and 20 percent, and stored in the ECM 104.

The disable-braking current as used herein, refers the total amount of current required by the propulsion system for forward movement on a grade, and is the sum of the cracking current plus the offset current.

The ECM 104 may store or access a memory unit for storing user input and/or vehicle characteristics. The memory unit and/or ECM 104 may store any or all of the cracking current, the offset current, the disable-braking current, and a threshold grade. Herein, the threshold grade is an optional variable which refers to the desired minimum grade for use of the grade propulsion mechanisms. The grade threshold may be any grade including 0. (A threshold grade of 0 may indicate that the grade propulsion mechanisms would be always used.)

The ECM 104 may also store or include a memory unit for storing offset current-inclination map. Instead of containing merely one approximated offset value for a range of grades, the offset current-inclination map reflects a plurality of calibrated offset values for various grades within a grade range (e.g., from 0 to 20 percent, or from 5 to 15 percent). The current-inclination map may also be represented by a mathematical equation for computing/adjusting the offset current based on a given grade.

FIGS. 2 and 3 are block diagrams of control methods for machine propulsion, such as for a machine illustrated in FIG. 1. With reference to FIG. 1 and FIG. 2, a method for controlling a machine includes: a receiving a Hill Mode activation signal step 202, a receiving a propulsion command step 204, a transmitting a propel current step 206, and a disengaging braking step 208. Additionally, the method may also include receiving a Hill Mode deactivation signal step 210.

During the receiving a Hill Mode activation signal step 202, the ECM 104 receives a signal to activate Hill Mode. For example, the operator may press a button on the operator control 106 to signal a desire to use the Hill Mode. The activation signal could also be triggered by a sensor on the paver 100 (e.g., an inclination sensor) or could be sent by a remote unit (e.g., another vehicle).

During the receiving a propulsion command step 204, the ECM 104 receives a signal that movement of the paver 100 is requested (e.g., forward propulsion lever is activated by an operator using the operator control 106).

In the transmitting a propel current step 206, the ECM 104 transmits a current to the propel pump 108 according to the propulsion command received. For example, when an operator moves the propel lever on the operator control 106 forward, the ECM 104 increases, or ramps up, a propel current (e.g., a control current) to the propel pumps 108 (e.g., propel hystat pumps 108).

During the disengaging braking step 208, when the propel current is equal to or greater than the cracking current and the offset current stored in the ECM 104, then the ECM 104 sends a signal to release the brakes. After the brakes are released the machine 100, because the propel pumps 108 have been supplied sufficient current to overcome the rollback of a paving machine on an inclined grade, a smooth transition from stop to start, without rollback, may be achieved.

With reference to FIG. 1 and FIG. 3, another method for propulsion includes: a receiving a forward propulsion command step 302, a receiving a determining inclination step 304, a determining an offset current step 306, transmitting a propel current step 308, and disengaging a brake system step 310.

During the receiving a forward propulsion command step 302, the ECM 104 receives a signal that movement of the paver 100 is requested (e.g., forward propulsion lever is activated by an operator using the operator control 106).

During the determining an inclination step 304, the current inclination is transmitted to the ECM 104. The inclination may be inputted from an operator control 106, determined by an inclination sensor 102, or may be transmitted by a remote source, etc.

Optionally, the method described in FIG. 3 may include a verifying grade step 312, in which the current grade received in the determining an inclination step 304, is compared against a threshold grade (e.g., a threshold grade stored in the ECM 104). During optional step 312, if the current grade is greater than or equal to the threshold grade then the propulsion method would proceed to the determining an offset current step 306. If the current grade was less than the threshold grade then the paver 100 could immediately disengage the braking system and continue forward movement (e.g., proceed to the disengaging a brake system step 310). Additionally, during verifying grade step 312, the ECM 104 may transmit a signal to the operator control 106 or to a display panel (not shown) to indicate that the Hill Mode is active or inactive.

Once the current inclination (grade) is determined, then during the determining an offset current step 306, the offset current may be computed according to the current grade. The offset current may be computed by the ECM 104 according to an inclination-current offset map (or table), or by use of a formula to compute the offset according to the current grade. The ECM may also (or instead) compute the disable-brake current by adding the offset current to the cracking current (e.g., the predetermined cracking current).

In the transmitting a propel current step 308, the ECM 104 transmits a current to the propel pump 108 according to the propulsion command received. For example, when an operator moves the propel lever on the operator control 106 forward, the ECM 104 increases, or ramps up, a propel current (e.g., a control current) to the propel pumps 108 (e.g., propel hystat pumps 108).

During the disengaging a brake system step 310, when the propel current is equal to or greater than the cracking current and the offset current, then the ECM 104 sends a signal to release the brakes. After the brakes are released the machine 100 may move forward. And, because the propel pumps 108 have been supplied sufficient current to overcome the rollback of a paving machine on an inclined grade, a smooth transition from stop to start, without rollback, may be achieved. Furthermore, because the offset current is determined based on current grade, the offset current determined according to the method described in FIG. 3 may be more precise than the offset current determined according to the method described in FIG. 2, and may result in a smoother stop-to-start transition over a wider range of grades.

INDUSTRIAL APPLICABILITY

The grade propulsion system and method may be implemented in various machines. According to an embodiment disclosed herein, the grade propulsion system and method may be implemented in a paving machine 100 (e.g., a paving machine or paver).

The machine 100 include includes: a controller 104 (e.g., an electronic control module or "ECM" 104), an operator control 106, a propel pump 108, and a brake system 112. Optionally, the machine 100 may also include an inclination sensor 102 configured to determine the grade of an unpaved surface 114, and to electronically communicate with and transmit the grade of the unpaved surface 114 to the ECM 104.

On a level grade, when the propel system is engaged (e.g., an operator moves the propel lever on the operator control 106 forward), and Hill Mode is not engaged, the machine's controller 104 (e.g., an electronic control module "ECM" 104) increases, or ramps up, a control current to the propel pumps 108 (e.g., propel hystat pumps 108), and the brake system 112 is released just before the current is supplied to the propel pumps 108 to provide forward motion (e.g., the cracking current point). This allows a smooth take-off on flat ground. The propel pump cracking current is determined through pump control calibration, and may be stored in the ECM 104.

When Hill Mode is active, the ECM 104 may ramp up the propel current (e.g., control current) to the cracking current (e.g., stored in the ECM 104) of the propel pump plus the offset current (e.g., a predetermined offset current stored in the ECM 104) before releasing the brakes. This prevents rollback from happening on steep grades.

Alternatively, if the paver 100 includes an inclination sensor 102, the inclination sensor 102 may detect the current grade and transmit the paving grade to the ECM 104. The ECM 104 may then determine the offset current for the paving grade.

The offset current for a machine may be predetermined for any and all paving grades. A predetermined map that relates a grade to an offset current may be built into the control logic of the machine 100 (e.g., in the ECM 104). The predetermined map may be for any possible paving range, and may reflect any number of whole or fractional grades within the predefined range. Alternatively, the predetermined map may be a mathematical operation to determine the offset current for a selected grade.

As the detected grade is increased or decreased the ECM 104 would determine (or refine) what offset current to use based on the map. Therefore, as the inclination sensor 102 detects a paving grade, and transmits the value to the ECM 104, the ECM 104 may refine the offset value according to the detected slope.

The ECM 104 may then apply and ramp up the propel current to the propel pump, and when the propel current becomes equal to or greater than the cracking current (e.g., stored in memory of the ECM 104) plus the current offset, the ECM 104 may transmit a signal to release the braking system. Thus, the paver 100 may smoothly transition from stop to start without rollback regardless of the paving grade.

Although certain embodiments have been illustrated and described herein for purposes of description, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present invention may be implemented in a very wide variety of ways. This application is intended to cover any adaptations or variations of the embodiments discussed herein. Therefore, it is intended that embodiments in accordance with the present invention be limited only by the claims and the equivalents thereof.

What is claimed is:

1. A paver comprising:
   a propel pump;
   a brake system;
   an operator control configured to receive and transmit a propel command and a Hill Mode activation; and
   a controller electronically coupled to the propel pump, the brake system, and the operator control, the controller configured, after receiving the Hill Mode activation and the propel command, to transmit a propel current to the propel pump and disengage the brake system when the propel current is equal to or greater than a cracking current plus an offset current.

2. The paver of claim 1, further comprising a memory unit configured to store the cracking current and the offset current.

3. The paver of claim 1, further comprising a memory unit configured to store a disable braking current.

4. The paver of claim 1, further comprising a Hill Mode indicator for indicating the Hill Mode status to an operator.

5. The paver of claim 1, further comprising an inclination sensor configured to detect a paving grade inclination and transmit a paving grade inclination to the controller, wherein the controller is further configured to activate Hill Mode if the paving grade is greater than or equal to a threshold grade.

6. The paver of claim 5, wherein the threshold grade is greater than or equal to approximately 5 percent.

7. A paver comprising:
   a propel pump;
   a brake system;
   an inclination sensor for detecting a current paving grade,
   a controller electronically coupled to the propel pump, the brake system, the inclination sensor, and the memory unit, the controller configured to receive the current paving grade from the inclination sensor, and after receiving a forward propel signal, to determine an offset current according to the current paving grade, to transmit a propel current to the propel pump, and to disengage the brake system when the propel current is equal to or greater than a cracking current plus an offset current.

8. The paver of claim 7, further comprising a memory unit configured to store an offset current-inclination map correlating a paving grade to a predetermined offset current.

9. The paver of claim 8, wherein controller is further configured to determine the offset current according to the current paving grade and the offset current-inclination map.

10. The paver of claim 7, further comprising a memory unit configured to store the cracking current.

11. The paver of claim 7, further comprising a Hill Mode indicator for visually indicating a Hill Mode status to an operator.

* * * * *